Patented July 9, 1935

2,007,327

UNITED STATES PATENT OFFICE 2,007,327

PROCESS FOR THE PREPARATION OF PHENOL

James Irvin Carr, Miles Augustinus Dahlen, and Emmet Francis Hitch, Wilmington, Del., assignors to E. I. du Pont de Nemours & Company, Wilmington, Del., a corporation of Delaware No Drawing. Application May 26, 1933, Serial No. 673,100

3 Claims. (Cl. 260—154)

This invention relates to a process for the preparation of synthetic phenol.

The manufacture of synthetic phenol has been conducted on a large scale for many years. The commonly used procedure comprises a number of steps starting with the sulfonation of benzene with an excess of sulfuric acid. The reaction mass which results is composed chiefly of benzene-sulfonic-acid, the excess sulfuric acid used, and water formed in the reaction. To remove the sulfuric acid, lime is added and the calcium sulfate which forms is filtered off. The liming treatment also converts the benzene-sulfonic-acid into the calcium salt. Next, the solution containing the calcium salt of benzene-sulfonic-acid is treated with sodium carbonate to form the sodium salt of the sulfonated benzene and precipitate the displaced calcium as calcium carbonate. After removal of the calcium carbonate by filtration, the aqueous solution of sodium-benzene-sulfonate is evaporated to dryness and fused with caustic soda, forming sodium phenate and sodium sulfite. The melt is dissolved and treated with an acid such as sulfur dioxide to liberate phenol from the sodium phenate, the crude phenol is separated by gravity or solvent extraction, and the final operation consists in purification of the phenol, usually by vacuum distillation.

Numerous modifications and refinements of this process have been described, but the fundamental process has been altered little through the many years of its operation.

The outstanding disadvantage of the above process is the necessity of using an excess of sulfuric acid in the sulfonation, this excess forming no useful by-product, and greatly complicating the procedure.

It is an object of this invention to provide a new and improved process for the manufacture of synthetic phenol. Another object is to avoid the formation of considerable amounts of comparatively useless by-product. A further object is to provide a new outlet for utilizing sulfur dioxide which may occur in large quantities as a by-product in other chemical processes. Other objects will appear hereinafter.

These objects are accomplished by the following invention in which phenol is prepared by sulfonating benzene with sulfur trioxide in an inert solvent medium, preferably sulfur dioxide, and then hydrolyzing the benzene-mono-sulfonic-acid formed with an alkali metal hydroxide.

The following examples are illustrative of the preferred procedure for carrying out this invention. All quantities are stated in parts by weight.

Example 1

78 parts of benzene are dissolved in about 200 parts of liquid sulfur dioxide (free from water). 84 parts of sulfur trioxide (5% excess over the theory) are dissolved in about 200 parts of liquid sulfur dioxide. The volumes of the two solutions should be equal. 900–1000 parts of liquid sulfur dioxide are introduced into a suitable vessel equipped with an agitator and facilities for cooling below the boiling point of sulfur dioxide. While the mass is vigorously agitated, the solutions of benzene and sulfur trioxide in liquid sulfur dioxide are run simultaneously into the liquid sulfur dioxide contained in the sulfonator. It is desirable that the two solutions be added at opposite sides of the vessel in order that sulfonation shall occur under conditions of high dilution of the reactants. It is also desirable that the additions of the two reactants be made at almost exactly the same rates, thus insuring the presence of benzene and sulfur trioxide in practically equivalent quantities at all times. The time required for this addition should be regulated so that the reaction mass may be kept slightly below the boiling point of sulfur dioxide, thus preventing the loss of solvent.

When sulfonation is complete, the temperature is raised sufficiently to remove the sulfur dioxide by distillation. The sulfur dioxide is collected and reliquefied, and is suitable for use as a diluent in subsequent sulfonations. It is desirable that the temperature be raised finally to about 100° C. to facilitate the removal of the last portion of the sulfur dioxide. The mass is then diluted with water and the solution is neutralized with sodium sulfite. The quantity of water used is just sufficient to keep the sodium benzene-sulfonate in solution at 90–100° C. This solution is filtered (at 90–100° C.) to remove the insoluble impurities (iron hydroxide, a little diphenylsulfone, etc.), and is then evaporated to dryness to give solid sodium benzene-sulfonate.

The sodium benzene-sulfonate obtained from the above sulfonation is fused with caustic soda as follows:

To the fusion pot is added 260 parts of caustic soda and about 10 parts of water, and the mixture heated to about 300° C. At this temperature, while the mass is thoroughly agitated, the sodium benzene-sulfonate is added at such a rate that excessive foaming does not occur. When all the sulfonate has been added, the heating and stirring is continued and the temperature raised during about one hour to 330-350° C. The melt is then cooled and dissolved in a suitable quantity of water, and the phenol is liberated by passing sulfur dioxide into the mixture. The sulfur dioxide obtained by neutralization of the sulfonation may be used for this purpose. The solid sodium sulfite is separated by filtration and the phenol is extracted from the filtrate with an immiscible solvent, suitably ether. By distillation, the solvent is recovered and pure phenol obtained.

When properly conducted, the above operation will produce 75-85 per cent of the theoretical quantity of phenol based on the benzene used.

Example 2

78 parts of benzene are dissolved in about 200 parts of liquid sulfur dioxide, and 83 parts of sulfur trioxide (about 4% in excess of the theory) are made up to the same volume in sulfur dioxide solution. About 800 parts of sulfur dioxide are added to a pressure sulfonator, equipped with an efficient agitator, a jacket for cooling, and connected to two measuring tanks held under the same pressure by an equalizing system. The benzene and sulfur trioxide solutions are placed in the measuring tanks. The temperature is adjusted to 30° C. in the sulfonator, and the benzene and sulfur trioxide solutions are now added at approximately the same rate, holding the temperature at 30° by circulating cooling water through the jacket of the sulfonator. When the sulfonation is complete, the sulfur dioxide is removed as in Example 1, and the sulfonation mass is liquefied with a small quantity of water. It is then neutralized with sodium hydroxide, preferably as a strong aqueous solution.

The fusion kettle is charged with 250-270 parts of caustic soda and 10 parts of water are added. The mass is then heated with agitation to 300° C. The solution of sodium benzene-sulfonate obtained above is now slowly added, holding the temperature at about 300° C. The water from this solution is allowed to escape in the form of steam. After all the sulfonate has been added, the melt is raised to 330-350° C. during one hour. It is then cooled and diluted with water as in Example 1, and acidified with sulfur dioxide to the point where the sodium phenate is converted to phenol and the excess caustic soda is transformed into sodium sulfite. This acidification is made at such a concentration that most of the phenol separates as an oily layer and is removed in a separator. The sodium sulfite is recovered by filtration, and the dissolved phenol in the filtrate is recovered by extraction with a solvent, as in Example 1. The combined separated and extracted phenol is purified by distillation, preferably in a vacuum still.

In order to minimize the amount of diphenyl sulfone formed in the sulfonation, it has been found important to follow strictly the mixing procedure described in the examples; that is, dissolve the benzene and sulfur trioxide separately in liquid sulfur dioxide and then add the solutions simultaneously and preferably at an approximately equal rate of flow to a relatively large amount of liquid sulfur dioxide.

Certain of the details given in the foregoing examples may be varied within wide limits, however, without departing from the spirit of the invention. For example, attention is called particularly to the following permissible variations:

The quantity of liquid sulfur dioxide used may be varied within wide limits, but the ratio to the amount of benzene must be kept very high; for instance, it will be seen that in applicants' two examples this ratio of liquid sulfur dioxide to benzene is in the neighborhood of 15 to 1. Also, the quantity of sulfur trioxide used may be varied considerably. An amount less than or only equal to that required by theory may be used, in which case benzene will be recovered along with the sulfur dioxide. In order to obtain complete sulfonation a slight excess of sulfur trioxide over the amount required by theory gives the best results.

The temperature at which sulfonation may be carried out is subject to considerable variation, as are also the factors of time, rates of addition, dilution of sulfur trioxide and benzene, and amount of agitation.

The process of dilution and neutralization of the sulfonation mass may be varied as desired, i. e., various alkalies such as sodium hydroxide, sodium carbonate, sodium sulfite, sodium bisulfite, etc. may be used for the neutralization; and as disclosed in the example, the solution of the acid or sodium salt may or may not be filtered to remove insoluble impurities. Furthermore, the sodium benzene-sulfonate may be hydrolyzed as a dry salt or in the form of a strong solution or paste.

The conditions for the hydrolyzing of sodium benezene-sulfonate to phenol may be varied as to time, temperature, ratio of caustic alkali to sulfonate, etc. Further, an open-pot or vacuum fusion under substantially anhydrous conditions or a pressure hydrolysis under more dilute conditions may be used.

Acidification of the fusion may be carried out at various concentrations and with a variety of acids, among which may be mentioned sulfur dioxide, carbon dioxide, sulfuric acid, hydrochloric acid, etc.

The separation of phenol from the acidified melt may be accomplished in different ways, the most economical of which appear to be gravity separation, as in Example 2, extraction with an immiscible solvent as in Example 1, or steam distillation.

The final purification of the product by distillation may be conducted at atmospheric pressure or under vacuum.

This process brings about many improvements in the manufacture of phenol by the so-called "sulfonation process". More notable among the advantages are the following, due to the fact that complete sulfonation of benzene is effected with sulfur trioxide, using only slightly more than the theoretically required amount:

There is a material saving in cost of sulfonating since as a result of the widespread use of anhydrous sulfur dioxide as a refrigerant, methods have been developed for the preparation of this material at a very low cost; hence the sulfonation step in the process utilizes a cheap solvent, available in a high state of purity, at a low cost.

A large proportion of all sulfuric acid used is now manufactured by contact processes. As is well-known, these processes yield sulfur trioxide as the primary product, and sulfuric acid is obtained therefrom by absorption in weak sulfuric acid. Our new sulfonating processes utilize the primary sulfur trioxide as the sulfonating agent, thus eliminating one step of the old manufacturing procedure, with a resultant saving in cost. The cost of limestone ordinarily required for neutralizing the sulfonation mass is eliminated.

There is a decrease in the number of operations required for preparation of the sodium benzene-sulfonate, due to elimination of the costly "liming-out" process with its attendant neutralizations, filtrations, mechanical losses, and high labor, power, and capital costs.

Much less dilution of the sulfonation mass is required for neutralization than is necessary for the "liming-out" and "sodiation" in the older processes. As a result the cost of evaporating the sulfonate solution prior to fusion is materially lowered.

Wide use and large production of phenol is evidence of the commercial importance of the present invention.

As many apparently widely different embodiments of this invention may be made without departing from the spirit and scope thereof, it is to be understood that we do not limit ourselves to the specific embodiments thereof except as defined in the following claims.

We claim:

1. In a process of producing phenol, the steps which comprise monosulfonating benzene by simultaneously adding a solution of benzene in liquid sulfur dioxide and a solution of sulfur trioxide in liquid sulfur dioxide to a relatively large amount of liquid sulfur dioxide.

2. In a process of producing phenol, the steps which comprise monosulfonating benzene by simultaneously adding a solution of benzene in liquid sulfur dioxide and a solution of sulfur trioxide in liquid sulfur dioxide to a relatively large amount of liquid sulfur dioxide and purifying the reaction mass by separating sulfur dioxide, diluting, neutralizing and filtering off residue.

3. In a process of producing phenol, the steps which comprise monosulfonating benzene by simultaneously adding a solution of benzene in liquid sulfur dioxide and a solution of sulfur trioxide in liquid sulfur dioxide to a relatively large amount of liquid sulfur dioxide, the proportions by weight of reactants and diluent being substantially 78 parts of benzene, 84 parts of sulfur trioxide and 1300 parts of liquid sulfur dioxide.

JAMES IRVIN CARR.
MILES AUGUSTINUS DAHLEN.
EMMET FRANCIS HITCH.